(12) United States Patent
Zolotov

(10) Patent No.: US 10,742,878 B2
(45) Date of Patent: Aug. 11, 2020

(54) STEREO CAMERA DEVICE WITH IMPROVED DEPTH RESOLUTION

(71) Applicant: SYMBOL TECHNOLOGIES, LLC, Lincolnshire, IL (US)

(72) Inventor: Serguei Zolotov, Ottawa (CA)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/188,221

(22) Filed: Jun. 21, 2016

(65) Prior Publication Data

US 2017/0366749 A1    Dec. 21, 2017

(51) Int. Cl.
| | |
|---|---|
| *H04N 5/232* | (2006.01) |
| *H04N 5/222* | (2006.01) |
| *H04N 5/225* | (2006.01) |
| *H04N 1/00* | (2006.01) |
| *H04N 13/261* | (2018.01) |
| *H04N 13/239* | (2018.01) |
| *G03B 35/08* | (2006.01) |
| *H04N 13/296* | (2018.01) |

(52) U.S. Cl.
CPC ......... *H04N 5/23238* (2013.01); *G03B 35/08* (2013.01); *H04N 1/00204* (2013.01); *H04N 5/2226* (2013.01); *H04N 5/2258* (2013.01); *H04N 5/2259* (2013.01); *H04N 13/239* (2018.05); *H04N 13/261* (2018.05); *H04N 13/296* (2018.05); *H04N 2213/001* (2013.01)

(58) Field of Classification Search
CPC .. H04N 5/2328; H04N 5/2253; H04N 5/2254; H04N 5/2257; H04N 1/00204; H04N 13/0239; H04N 13/026; H04N 2013/0081; H04N 2201/0084; H04N 2201/0096; H04N 2213/001
See application file for complete search history.

(56) References Cited

U.S. PATENT DOCUMENTS

| | | | | |
|---|---|---|---|---|
| 3,959,580 | A * | 5/1976 | Chocol | G02B 3/08 348/360 |
| 4,725,863 | A * | 2/1988 | Dumbreck | G03B 35/08 348/345 |
| 6,094,215 | A * | 7/2000 | Sundahl | G03B 35/02 348/155 |
| 6,950,121 | B2 * | 9/2005 | Tserkovnyuk | G03B 35/08 348/47 |
| 6,967,678 | B2 * | 11/2005 | Baker | G01C 11/02 348/169 |
| 7,486,311 | B2 * | 2/2009 | Baker | G01C 11/02 348/208.14 |
| 8,072,517 | B2 * | 12/2011 | Chang | G03B 37/00 348/262 |
| 8,085,293 | B2 * | 12/2011 | Brodsky | H04N 13/0217 348/169 |

(Continued)

*Primary Examiner* — Brian P Yenke

(57) ABSTRACT

A stereo camera device with tilted fields of view is provided, which includes a pair of camera devices located such that respective fields of view (FOVs) of the pair of camera devices are tilted away from each other, and at least partially overlapping in a common working FOV. The device further includes a processor which receives respective images from each of the pair of camera devices, combines respective portions of the respective images corresponding to the common working FOV into stereo images.

17 Claims, 7 Drawing Sheets

(56) References Cited

U.S. PATENT DOCUMENTS

| | | | | |
|---|---|---|---|---|
| 8,160,440 B2* | 4/2012 | Kishida | | G03B 35/10 348/47 |
| 8,238,741 B2* | 8/2012 | Pace | | G03B 35/08 348/240.99 |
| 8,243,123 B1* | 8/2012 | Geshwind | | H04N 13/0022 348/42 |
| 8,358,332 B2* | 1/2013 | Hendrickson | | H04N 13/0239 345/419 |
| 8,406,619 B2 | 3/2013 | Cameron et al. | | |
| 9,275,459 B2* | 3/2016 | Goma | | H04N 5/23212 |
| 9,319,660 B2* | 4/2016 | Liou | | H04N 13/0239 |
| 9,426,361 B2* | 8/2016 | Venkataraman | | H04N 5/23232 |
| 9,479,758 B2* | 10/2016 | Woo | | H04N 13/0239 |
| 9,565,416 B1* | 2/2017 | Lewkow | | H04N 5/23212 |
| 9,571,819 B1* | 2/2017 | Barron | | H04N 13/0239 |
| 9,699,379 B1* | 7/2017 | Baldwin | | H04N 5/2258 |
| 2004/0196282 A1* | 10/2004 | Oh | | G06T 17/00 345/419 |
| 2007/0014347 A1* | 1/2007 | Prechtl | | H04N 5/232 375/240.01 |
| 2010/0097444 A1* | 4/2010 | Lablans | | G03B 35/00 348/46 |
| 2010/0265369 A1* | 10/2010 | Chang | | G03B 35/08 348/262 |
| 2010/0295926 A1* | 11/2010 | Estrada | | G06T 7/85 348/47 |
| 2010/0303207 A1* | 12/2010 | Tsujii | | A61B 6/4405 378/98 |
| 2011/0216158 A1* | 9/2011 | Bigioi | | G06T 5/006 348/36 |
| 2011/0221869 A1* | 9/2011 | Yamaya | | H04N 13/0239 348/47 |
| 2012/0162379 A1* | 6/2012 | Dahi | | H04N 5/23254 348/47 |
| 2013/0066526 A1* | 3/2013 | Mondragon | | G09G 5/00 701/48 |
| 2013/0076863 A1* | 3/2013 | Rappel | | G06T 11/00 348/46 |
| 2014/0098195 A1* | 4/2014 | Pace | | H04N 13/0242 348/47 |
| 2014/0111623 A1* | 4/2014 | Zhao | | H04N 13/0022 348/47 |
| 2015/0124060 A1* | 5/2015 | Hasegawa | | G03B 35/08 348/47 |
| 2015/0145966 A1* | 5/2015 | Krieger | | H04N 13/0018 348/47 |
| 2015/0329221 A1* | 11/2015 | Georgeson | | G01N 29/0654 702/36 |
| 2015/0334278 A1* | 11/2015 | Apel | | G02B 7/023 348/148 |
| 2016/0088282 A1* | 3/2016 | Sadi | | H04N 13/254 348/38 |
| 2016/0088287 A1* | 3/2016 | Sadi | | H04N 13/254 348/43 |
| 2016/0212409 A1* | 7/2016 | Cole | | H04N 13/0022 |
| 2016/0227193 A1* | 8/2016 | Osterwood | | G01S 17/42 |
| 2017/0026634 A1* | 1/2017 | Mirlay, Sr. | | G03B 13/10 |
| 2017/0107698 A1* | 4/2017 | Yamaguchi | | H04N 7/181 |
| 2017/0150126 A1* | 5/2017 | Kim | | H04N 13/0271 |
| 2017/0195537 A1* | 7/2017 | Chang | | H04N 5/232 |
| 2017/0262676 A1* | 9/2017 | Gifford | | H04B 1/3888 |
| 2017/0340394 A1* | 11/2017 | Gemmel | | A61B 34/20 |
| 2017/0358062 A1* | 12/2017 | Podnar | | G06T 5/006 |
| 2017/0358101 A1* | 12/2017 | Bishop | | G06T 7/579 |
| 2017/0374290 A1* | 12/2017 | Ootorii | | G03B 15/00 |

* cited by examiner

STEREO CAMERA DEVICE WITH IMPROVED DEPTH RESOLUTION

BACKGROUND

Stereo digital cameras can be used to measure object dimensions but such dimensioning is sensitive to stereo system depth resolution, which is based on a minimum difference in scene depth that can be detected by a stereo digital camera. Stereo system depth resolution, in turn, is sensitive to baseline and focal length of the cameras; for example, to achieve an improvement in stereo system depth resolution requires increasing the baseline and/or focal length of the cameras. Techniques that improve depth resolution of stereo systems work within those fundamental boundaries, and these two parameters (baseline and focal length) define a minimal footprint (e.g., dimensions) of a stereo digital camera. Within these constrains, it can be difficult to develop miniature stereo systems with depth resolution capabilities suitable for dimensioning objects, especially in industrial applications where there can be particular accurate depth resolution requirements.

DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
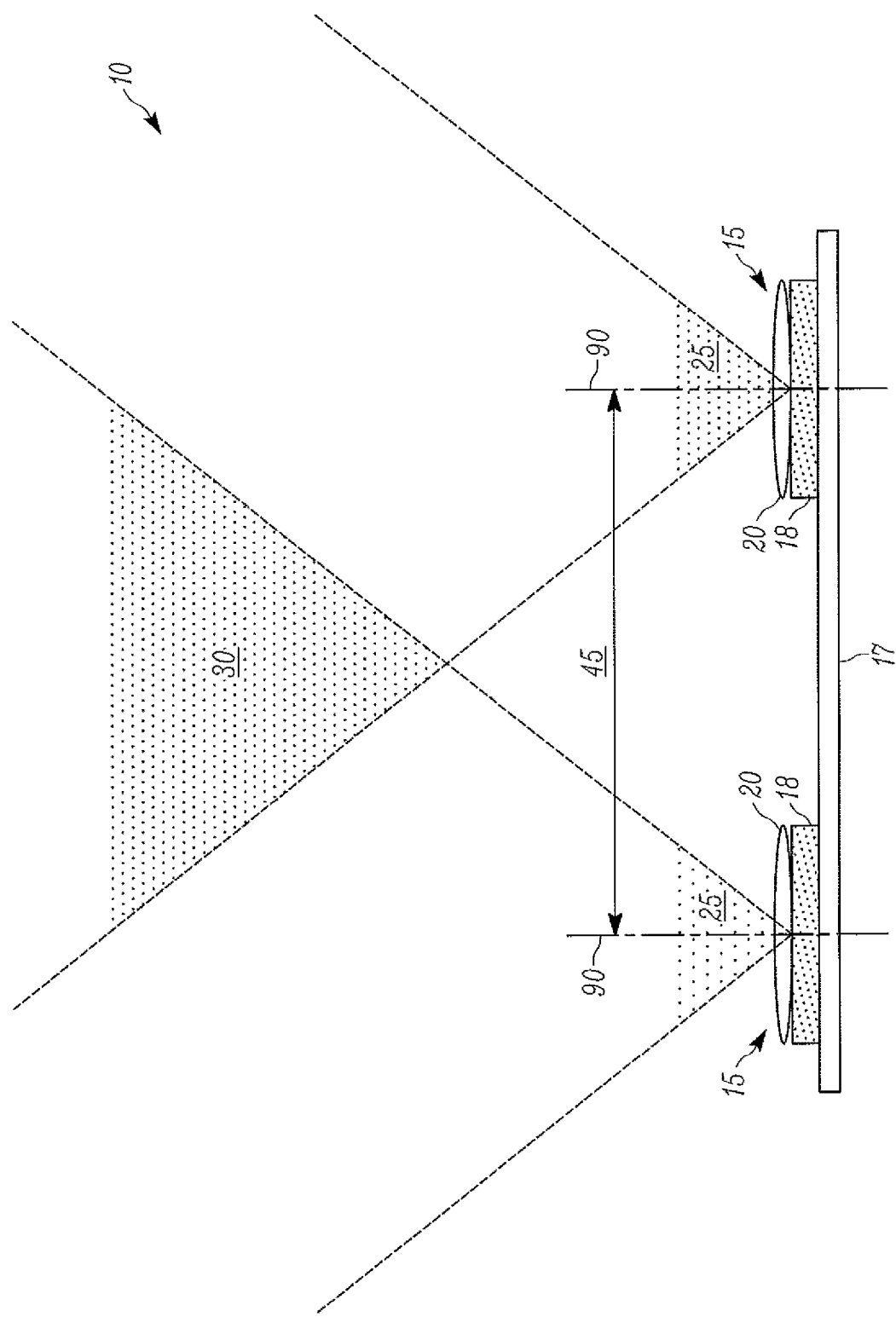
FIG. 1 depicts a schematic diagram of a stereo camera device, according to the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides a device comprising: a pair of camera devices located such that respective fields of view (FOVs) of the pair of camera devices are tilted away from each other, and at least partially overlapping in a common working FOV; and, a processor configured to: receive respective images from each of the pair of camera devices; and, combine respective portions of the respective images corresponding to the common working FOV into stereo images.

Tilting of the respective FOVs of the pair of camera devices can be symmetric with respect to a centerline between the pair of camera devices.

Respective image sensors of each of the pair of camera devices can be located on respective baseboards tilted away from each other.

Respective image sensors of each of the pair of camera devices can be located on respective baseboards tilted away from each other, the respective baseboards connected using a connector that defines an angle between one or more of: (a) the respective baseboards and (b) the pair of camera devices.

Each camera device in the pair of camera devices can comprise a respective rectilinear wide-angle lens.

Each camera device in the pair of camera devices can comprise a respective image sensor and a respective lens, respective FOVs of each of the respective image sensor and the respective lens about matching each other.

Each camera device in the pair of camera devices can comprise a respective image sensor and a respective wide-angle lens, image sensor FOVs being smaller than lens FOVs, the lens FOVs corresponding to the respective FOVs of each camera device in the pair of camera devices that at least partially overlap, a respective position of the respective image sensor being selected such that each of the image sensor FOVs are common to an overlapping portion of the lens FOVs.

The device can further comprise: a first device configured to change tilting of the respective FOVs of the pair of camera devices; and a second device configured to move respective image sensors of the pair of camera devices away from each other as tilting of the respective FOVs of the pair of camera devices increases.

The device can further comprise: a first device configured to change tilting of the respective FOVs of the pair of camera devices; and a second device configured to move respective image sensors of the pair of camera devices away from each other as tilting of the respective FOVs of the pair of camera devices increases, wherein the processor is further configured to control a respective tilting of each of the first device and the second device.

Respective image sensors of each pair of camera devices can be mounted on a flat stereo board, and each camera device in the pair of camera devices comprises a respective tilted lens and a respective optical fiber which conveys light from the respective lens to a respective image sensor.

Respective image sensors of each of the pair of camera devices can be mounted on a flat stereo board, and each camera device in the pair of camera devices comprises a respective tilted lens and a respective optical fiber which conveys light from the respective lens to a respective image sensor, wherein respective tilted lenses and respective optical fibers are components of an optical attachment to the flat stereo board.

The processor can be further configured to extract depth information from the respective portions of the respective images corresponding to the common working FOV.

The device can further comprise a chassis, external components of the pair of camera devices located on a same side of the chassis.

The device can further comprise a mobile scanner.

The device can further comprise a mobile computing device.

Another aspect of the specification provides a method comprising: at a device comprising a processor and a pair of camera devices located such that respective fields of view (FOVs) of the pair of camera devices are tilted away from each other, and at least partially overlapping in a common working FOV: receiving, at the processor, respective images from each of the pair of camera devices; and, combining, at the processor, respective portions of the respective images corresponding to the common working FOV into stereo images.

The method can further comprise: extracting, at the processor, depth information from the respective portions of the respective images corresponding to the common working FOV.

The device can further comprise: a first device configured to change tilting of the respective FOVs of the pair of camera devices; and a second device configured to move a respective image sensor of each of the pair of camera devices away from each other as tilting of the respective FOVs of the pair of camera devices increases, and the method can further comprise, controlling, at the processor, a respective tilting of each of the first device and the second device.

Another aspect of the specification provides a non-transitory computer-readable medium storing a computer program, wherein execution of the computer program is for: at a device comprising a processor and a pair of camera devices located such that respective fields of view (FOV s) of the pair of camera devices are tilted away from each other, and at least partially overlapping in a common working FOV: receiving, at the processor, respective images from each of the pair of camera devices; and, combining, at the processor, respective portions of the respective images corresponding to the common working FOV into stereo images. Execution of the computer program can be further for: extracting, at the processor, depth information from the respective portions of the respective images corresponding to the common working FOV.

Prior to discussing present implementations, attention is first directed to FIG. 1, which depicts a stereo camera device 10, according to the prior art. In particular, stereo camera device comprises a pair of camera devices 15, each of which comprise a respective image sensor 18, mounted on a common baseboard (also referred to as a flat stereo board 17), and a respective lens 20. Fields of view 25 of each of camera devices 15 are indicated by broken lines and a shaded triangle is provided as a visual guide for a respective location thereof with respect to each of camera devices 15 (though it is appreciated that fields of view 25 of each of camera devices 15 extend beyond the shaded triangles as indicated by the broken lines: this convention will be used throughout the present specification). For clarity, the term "field of view" will interchangeably referred to herein using the abbreviation "FOV", and the term "fields of view" will interchangeably be referred to herein using the abbreviation "FOVs". FOVs 25 of each of camera devices 15 overlap in a common working FOV 30, which defines the region where stereoscopic imaging can occur; in other words, objects in the common working FOV 30 can be imaged stereoscopically using camera devices 15, and further depth information can be extracted from pairs of images from each of camera devices 15 that include the common working FOV 30.

FIG. 1 also depicts a centerline 90 of each of camera devices 15, and a baseline 45 of camera devices 15 is defined by a distance there between. Furthermore, to increase a depth resolution of stereo camera device 10, either baseline 45 can be increased, which is difficult when stereo camera device 10 is incorporated into a mobile device, or a focal length of camera devices 15 can be increased, which in turn reduces a respective FOV.

Attention is next directed to FIG. 2 and FIG. 3, which depict a device 101 that incorporates a stereo camera device 102 according to present implementations; stereo camera device 102 will be described in more detail below in FIGS. 4 to 6, and device 101 will be described hereafter.

Figure 2:
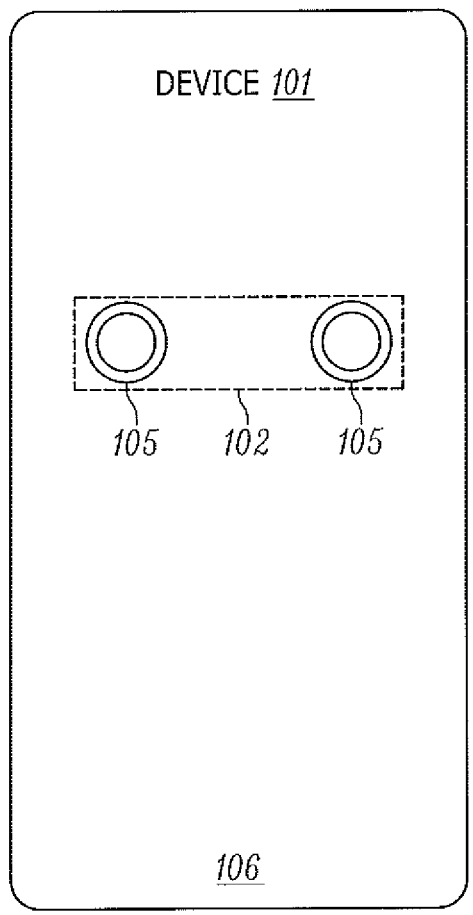
FIG. 2 depicts front and rear views of a device that includes a stereo camera device with tilted fields of view, in accordance with some implementations.
Figure 2:
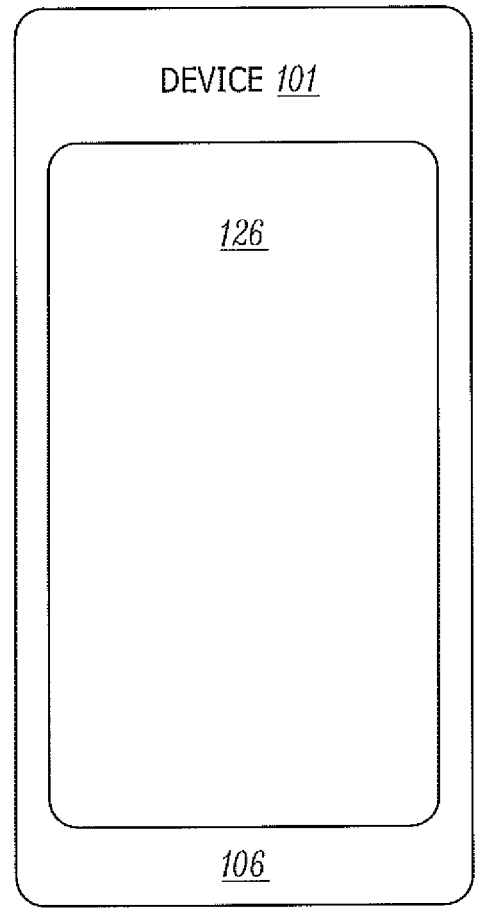

FIG. 2 depicts a rear perspective view 1-I and a front perspective view 1-II of device 101; FIG. 3 depicts a schematic block diagram of device 101. With reference to both FIG. 2 and FIG. 3, the device 101 comprises: a stereo camera device 102, (schematically indicated using broken lines in each of FIG. 2 and FIG. 3) that in turn comprises a pair of camera devices 105 (interchangeably referred to hereafter, collectively, as camera devices 105, and generically as a camera device 105); a chassis 106; an image processor 120 (interchangeably referred to hereafter as processor 120); a memory 122; a communication interface 124 (interchangeably referred to hereafter as interface 124); a display device 126; at least one input device 128 (interchangeably referred to hereafter as input device 128); a speaker 132; and a microphone 134.

An implementation of device 101 can comprise a special-purpose imaging device configured for acquiring stereoscopic images using stereo camera device 102, and which can be further configured for one or more of mobile scanning of objects using stereo camera device 102, object dimensioning using images acquired from stereo camera device 102, warehousing applications, and the like. As such, implementations of device 101 can include a graphics processing unit (GPU), a graphics processing device, a graphics processing engine, a video processing device, and the like.

Other implementations of device 101 can include electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances, mobile camera devices and the like that are specially configured for object dimensioning. Other suitable devices are within the scope of present implementations. For example, device 101 need not comprise a mobile communication device, but rather can comprise a device with specialized functions, for example a device having warehouse inventory tracking and/or other data acquisition functionality, such as a mobile scanner having one or more of radio frequency identification (RFID) reader, Near Field Communication (NFC) reader, imager, and/or laser-based scanner data acquisition components.

Furthermore, while device 101 includes interface 124, speaker 132, microphone 134, it is appreciated that such components can be optional. Furthermore, it is appreciated that display device 126 and input device 128 can also be optional, and/or can be external to device 101.

While a specific physical configuration of device 101 is depicted in FIG. 2, other physical configurations of device 101 are within the scope of present implementations. For example, device 101 can further include one or more handles, such as a handle below display device 126, as well as a trigger for triggering the data acquisition components and the like.

Camera devices 105 can each comprise a digital camera, an RGB (red-green-blue) digital camera, and the like, configured to acquire digital images, including, but not limited to, images in a video stream. Details of camera devices 105 will be described in further detail below, however, pair of camera devices 105 are generally located such that respective fields of view (FOV s) of pair of camera devices 105 are tilted away from each other, and at least partially overlapping in a common working FOV.

As depicted in FIG. 2, external components of camera devices 105 can be located on a rear side of device 101 (e.g. on a rear side of chassis 106), and display device 126 can be located on a front side of device 101 (e.g. on a front side of chassis 106), such that digital images can be captured at a rear side of device 101. Put another way, fields of view of each of camera devices 105 overlap (as depicted in FIG. 4) as both camera devices 105 are disposed at a rear side of device 101 (e.g. on a rear side of chassis 106). However, camera devices 105 need not be disposed on a same side of device 101 as long as fields of view of each of camera devices 105 meet criteria described in further detail below which includes fields of view of each of camera devices 105 overlapping (e.g. an object being imaged by device 101 and/or stereo camera device 102 is in a field of view of each of camera devices 105). However, as depicted, external components of camera devices 105 are located on a same side and/or a common side of chassis 106.

Figure 3:
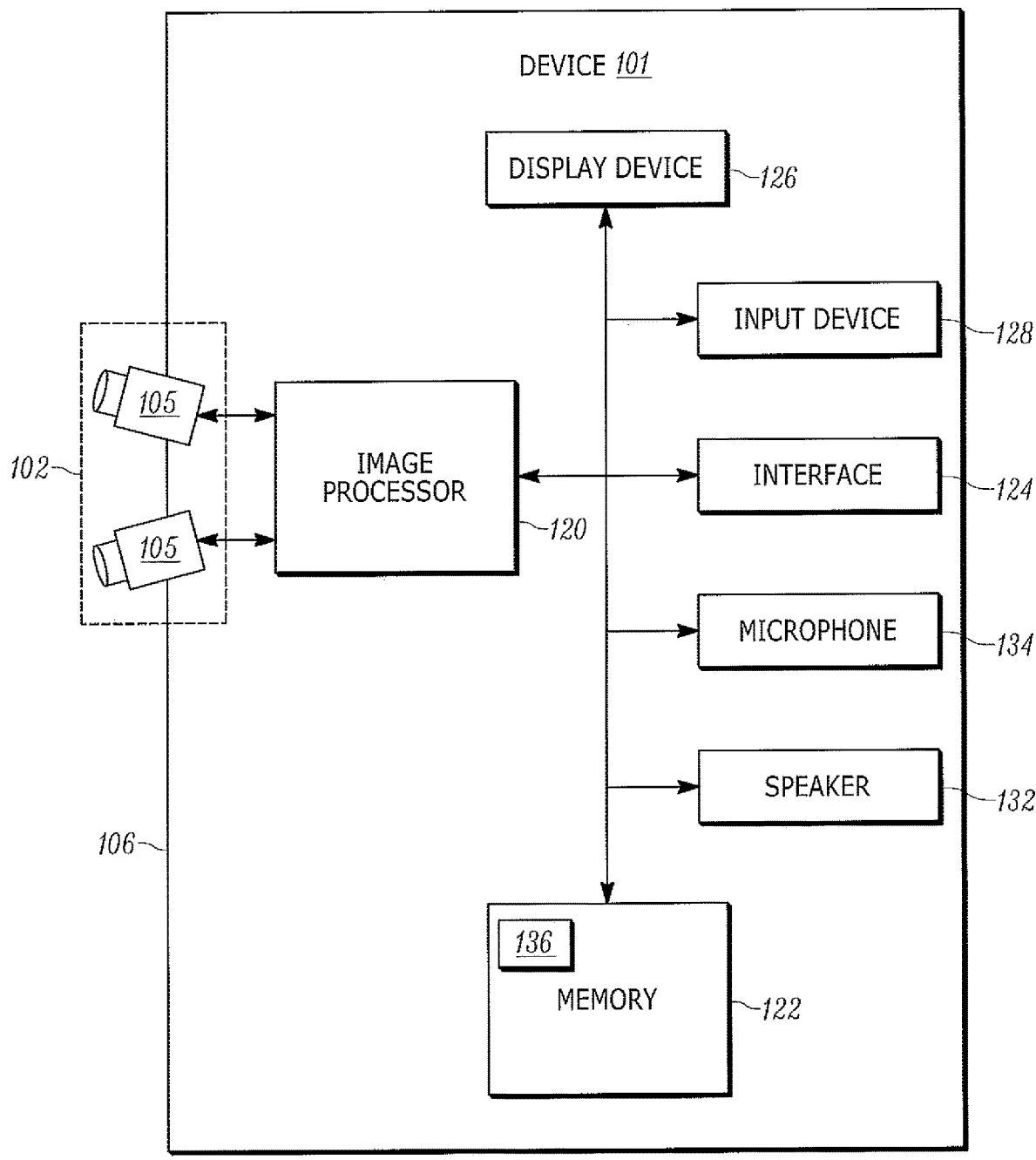
FIG. 3 depicts a schematic block diagram of the device of FIG. 2, in accordance with some implementations.

It is appreciated that the specific locations of each of camera devices 105 in each of FIG. 2 and FIG. 3 are merely schematic and do not necessarily represent actual relative positions of camera devices 105; in other words, in FIG. 1, while camera devices 105 are depicted as side by side across a transverse longitudinal of device 101, camera devices 105 can be located anywhere on device 101, presuming that their fields of view at least partially overlap such that physical objects in their respective fields of view can be imaged by both camera devices 105.

Imaging processor 120 can comprise a processor and/or a plurality of processors, including but not limited to one or more central processors (CPUs) and/or one or more processing units and/or one or more graphic processing units (GPUs); either way, processor 120 comprises a hardware element and/or a hardware processor. Indeed, in some implementations, processor 120 can comprise an ASIC (application-specific integrated circuit) and/or an FPGA (field-programmable gate array) specifically configured to implement the functionality of device 101. Hence, device 101 is preferably not a generic computing device, but a device specifically configured to implement specific functionality including: receiving respective images from each the pair of camera devices 105; and, combining respective portions of the respective images corresponding to the common working FOV into stereo images. For example, device 101 and/or processor 120 can specifically comprise a computer executable engine configured to perform camera and/or image processing functionality including processing images from pair of camera devices 105.

Memory 122 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module and/or a non-volatile memory.

In particular, memory 122 can store an application 136 that, when executed by processor 120, enables processor 120 to: receive respective images from each of pair of camera devices 105; and, combine respective portions of the respective images corresponding to the common working FOV into stereo images. In some implementations, processor is further configured to extract depth information from the respective portions of the respective images corresponding to the common working FOV, for example when processing application 136.

Processor 120 can be further configured to communicate with display device 126, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like). In particular, processor 120 can be configured to control display device 126 to render one or more digital images from camera devices 105.

Device 101 generally comprises at least one input device 128 configured to receive input data, and can comprise any suitable combination of input devices, including but not limited to a keyboard, a keypad, a pointing device, a mouse, a track wheel, a trackball, a touchpad, a touch screen (e.g. integrated with display device 126), and the like. Other suitable input devices are within the scope of present implementations. In some implementations, one or more of input device 128 and display device 126 can be external to device 101, with processor 120 in communication with any external components via a suitable connection and/or link.

As depicted, device 101 further comprises an optional speaker 132 and an optional microphone 134 (either of which can alternatively be external to device 101). Speaker 132 comprises any suitable speaker for converting audio data to sound to provide one or more of audible alerts, audible communications from remote communication devices, and the like. Microphone 134 comprises any suitable microphone for receiving sound and converting to audio data. Speaker 132 and microphone 134 can be used in combination to implement telephone and/or communication functions at device 101.

As depicted, processor 120 also connects to optional interface 124, which can be implemented as one or more radios and/or connectors and/or network adaptors, configured to wirelessly communicate with one or more communication networks (not depicted), presuming that device 101 is to be used also as a communication device. It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

While not depicted, device 101 further comprises a power supply, including, but not limited to, a battery, a power pack and the like, and/or a connection to a mains power supply and/or a power adaptor (e.g. and AC-to-DC (alternating current to direct current) adaptor). In general the power supply powers components of device 101.

Hence, it should be understood that in general a wide variety of configurations for device 101 are contemplated.

In FIG. 2 and FIG. 3, cameras 105 are each enclosed by broken lines indicating that cameras 105 are components of stereo camera device 102. In particular, in FIG. 3, cameras 105 are schematically depicted as tilting away each other, however, in other implementations, stereo camera device 10 of the prior art can be modified such that fields of view of camera devices 15 tilt away from each other (for example, see FIG. 6). In other words, various implementations of such tilting, and stereo camera device 102, are within the scope of the present specification, and are described hereafter.

Figure 4:
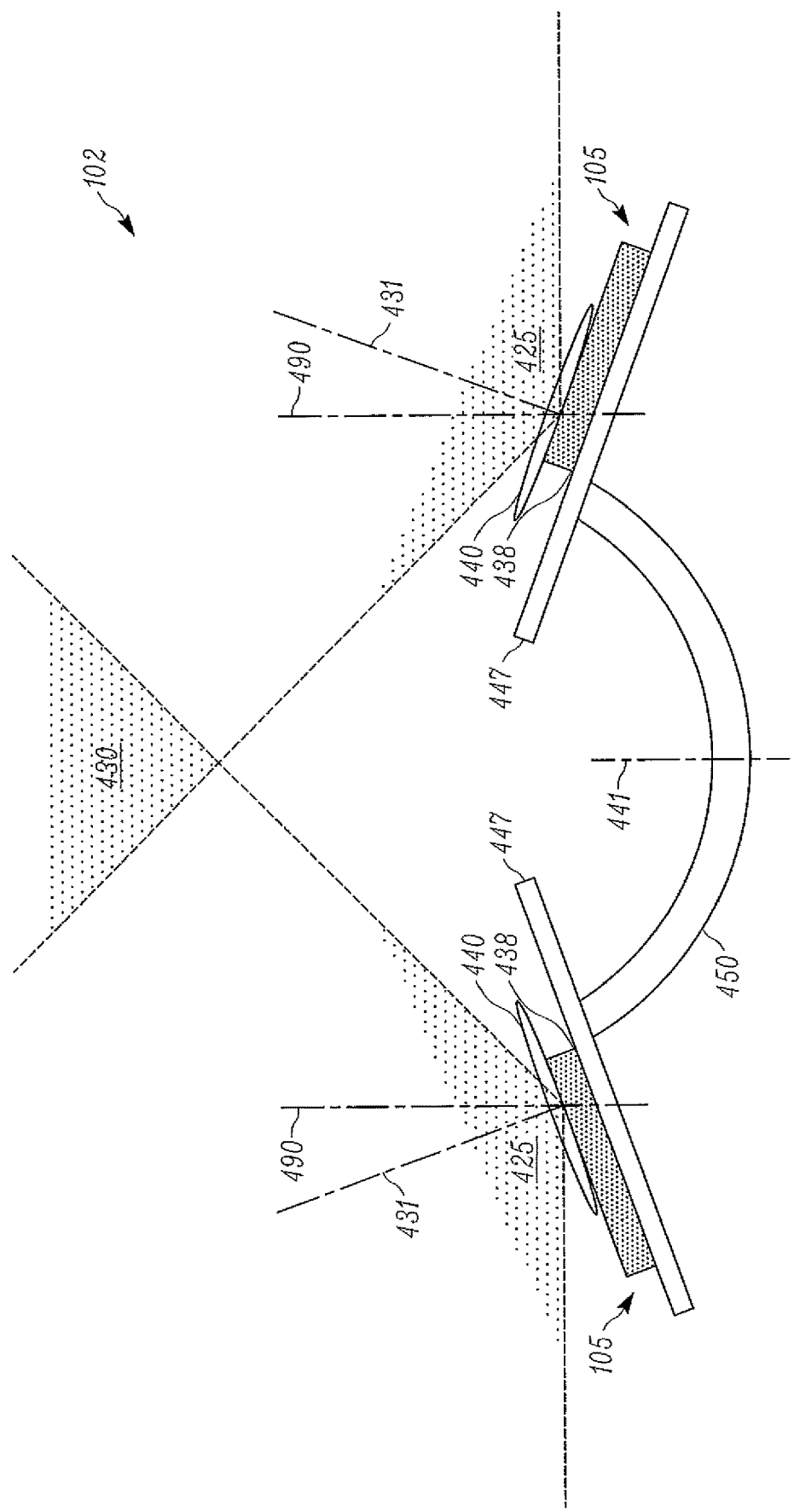
FIG. 4 depicts a stereo camera device with tilted fields of view, in accordance with some implementations.

Attention is next directed to FIG. 4, which depicts details of stereo camera device 102 according to some implementations. In particular, stereo camera device 102 comprises: pair of camera devices 105 located such that respective FOVs 425 of pair of camera devices 105 are tilted away from each other, and at least partially overlapping in a common working FOV 430. For example, FOVs 425 can be tilted away from each other by way of respective centerlines 431 of the FOVs 425 being tilted away with respect to each other. For example, each of respective centerlines 431 are normal to each respective camera 105, and each respective centerline 431 forms an angle with a centerline 441 between pair of camera devices 105.

Each camera device 105 comprises a respective image sensor 438 and a respective lens 440. Each respective image sensor 438 can include, but is not limited, to a charge-coupled device (CCD), and the like, configured to convert light into digital images.

Tilting of respective FOVs 425 of pair of camera devices 105 is symmetric away from a centerline 441 between pair of camera devices 105. In other words, tilting of respective FOVs 425 of pair of camera devices 105 are each at a same angle away from a centerline 441 (e.g. an angle that each respective centerlines 431 forms with centerline 431 is about the same). However, in other implementations, the tilting can be asymmetric as long as respective FOVs 425 overlap in common FOV 430 and the difference in angular view of objects in common FOV 430 is accounted for by a processor processing images from each respective image sensor 438.

Such tilting can be accomplished using various apparatus. For example, as suggested in FIG. 3, each camera device 105 can be mounted at an angle to chassis 106.

In other implementations, as depicted in FIG. 4, respective image sensors 438 of each of pair of camera devices 105 are located on respective baseboards 447 tilted away from each other in a manner described above. In some of these implementations, each of respective baseboards 447 can be independently mounted to a chassis 106. However, as depicted, respective baseboards 447 can be connected using a connector 450 that defines an angle between one or more of: respective baseboards 447; and pair of camera devices 105. In other words, as depicted, connector 450 comprises a semicircular arm to which each respective baseboard 447 is mounted at opposite angles. However, connectors of other shapes are within the scope of present implementations. Furthermore, in some implementations, connector 450 can comprise electrical connections between camera devices 105 and processor 120 (though such electrical connections between camera devices 105 and processor 120 can also be external to connector 450).

In some implementations, a FOV of each respective lens 440 and each respective image sensor 438 at each camera device 105 about matches each other. Hence, FOV 425 of each camera device 105 is defined by respective image sensor 438 and/or by respective lens 440. In these implementations, each respective lens 440 can be about centered on each respective image sensor 438.

Figure 5:
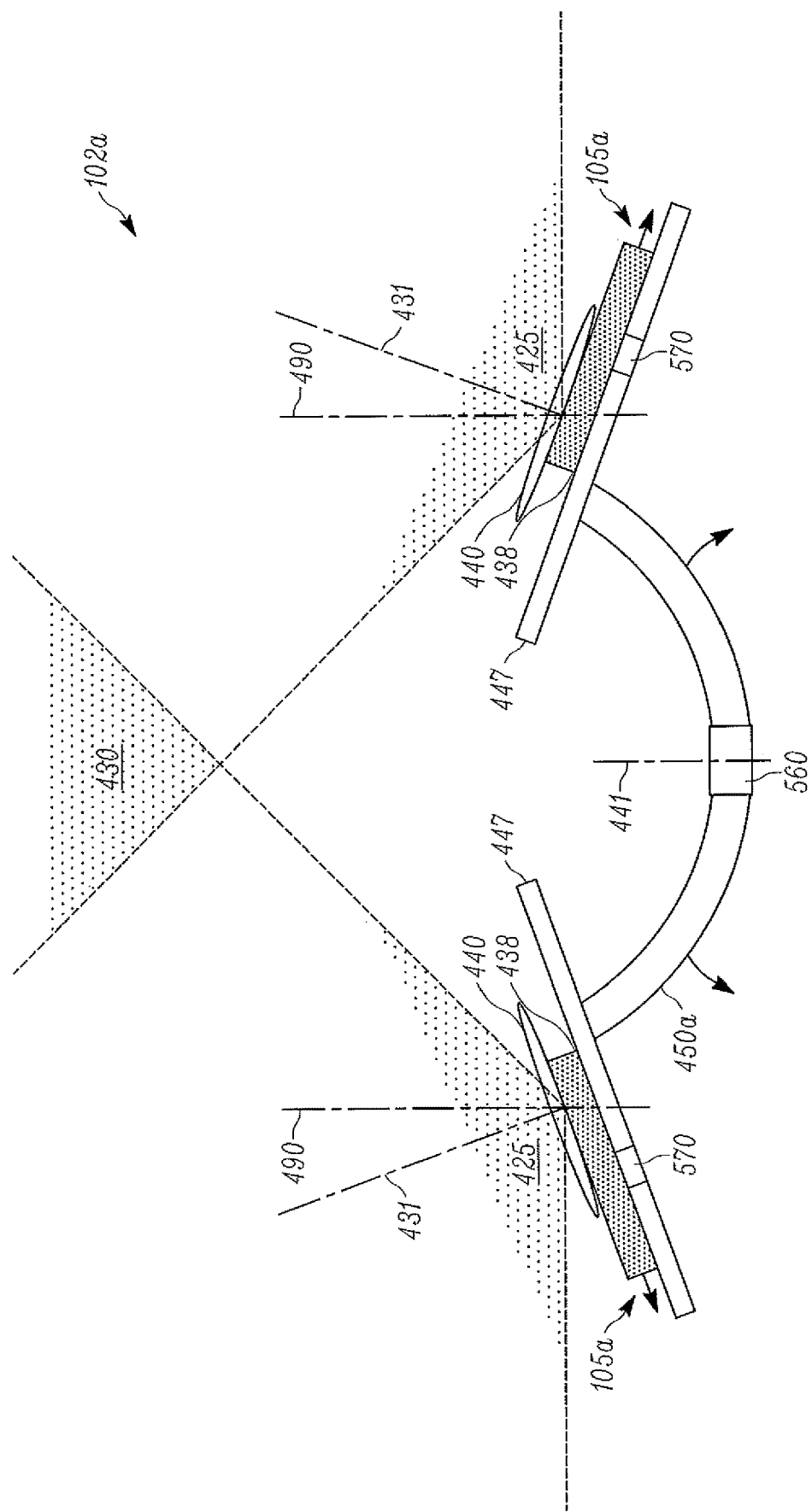
FIG. 5 depicts an alternative stereo camera device with tilted fields of view, in accordance with some implementations.

However, in other implementations, as depicted in FIG. 4 and FIG. 5, each respective lens 440 can comprise a respective rectilinear wide-angle lens, and image sensor FOVs can be smaller than lens FOVs. Hence, respective FOVs 425 of each camera device 105 are defined by FOVs of each respective lens 440. Put another way, the lens FOVs correspond to respective FOVs 425 of pair of camera devices 105 that at least partially overlap, and a respective position of a respective image sensor 438 can be selected such that each of the image sensor FOVs are common to an overlapping portion of the lens FOVs.

In other words, in these implementations, respective FOVs 425 of each camera device 105 are defined by lens FOVs. Hence, a position of each respective image sensor 438 relative to a respective lens 440 is selected such that light from common working FOV 430 is imaged by each respective image sensor 438; indeed a position of each image sensor 438, relative to a respective lens 440, is selected to maximize imaging of common working FOV 430 at each image sensor 438.

As depicted, this can result in each respective image sensor 438 being moved, along the baseboard 447, outward relative to a respective lens 440. Put another way, a center of each image sensor 438 can be moved away from a respective center of a respective lens 440 such that only a portion of each respective image sensor 438 images common working FOV 430, for example a lateral portion that overlaps with a respective lend 440. Hence, only that portion of a respective image, produced by each image sensor 438, that includes common FOV 430 will correspond to an image of common working FOV 430. In other words, such an offset between an image sensor 438 and a respective lens 440 can result in a loss of resolution of images of common FOV 430 as only a portion of each image sensor 438 is used to image common FOV 430; hence, there can be a tradeoff between resolution and image disparity as respective image sensor 438 are moved away from each other.

Some of such implementations can result in pincushion distortions in images acquired by camera devices 105; in some implementations, processor 120 can hence be configured to correct acquired images and/or stereo data for such pincushion distortions to minimize distortions therein, which can generally enhance the depth resolution of camera device 102, as such corrections can generally increase pixel disparity (which in turn can improve depth resolution); such corrections can be performed heuristically and/or using a calibration of stereo camera device 102 which can be performed during a provisioning and/or calibration process particular to the geometry of stereo camera device 102. Alternatively, each of lenses 440 can be adapted to optically correct for such pincushion distortions, assuming that positions of lenses 440 and image sensors 438 are fixed relative to one another.

In any event, by tilting respective FOVs 425 of pair of camera devices 105 away from each other, a similar physical baseline to prior art stereo camera device 10 can be used in stereo camera device 102 (as indicated by lines 490), but increased stereo depth resolution will result. In particular, while common working FOV 430 is reduced as compared to common working FOV 30 of the prior art, images of common working FOV 430 are imaged at an angle at each camera device 105, which results in an increase in pixel disparity in imaged objects. Specifically, pixel disparity can be defined as a difference in number of pixels between endpoints of an object along an axis of a stereo system, and the tilting of respective FOVs 425 of camera devices 105 results in an increase in the difference in number of pixels between endpoints of an object along an axis (e.g. centerline 441) of stereo camera device 102. Hence, in particular, stereo camera device 102 can be used to improve stereo depth resolution in mobile devices with smaller physical footprints, as increasing a baseline is not necessarily a viable option.

The angle of tilt can depend on a degree of desired depth resolution; however as the angle increases, common working FOV 430 decreases as the overlap between FOVs 425 of camera devices 105 will decrease. Hence, a tradeoff between these features can be determined heuristically, from trial and error, and/or using optical modeling software. For example, in a design phase, a given footprint of device 101 and/or chassis 106 can be used as a starting point to determine an initial baseline (e.g. how far apart can camera devices 105 be positioned), and a degree of tilt can be selected based on: a. a type of lens to be used with camera devices 105 (e.g. a FOV of such lenses); and b. a desired depth resolution.

In the foregoing specification, specific implementations have been described. However, one of ordinary skill in the art appreciates that various modifications and changes can be made. For example, attention is next directed to FIG. 5 which depicts an alternative stereo camera device 102a comprising a pair of camera devices 105a; stereo camera device 102a and pair of camera devices 105a are each substantially similar to stereo camera device 102 and pair of camera devices 105, with like elements having like numbers. However, in contrast to stereo camera device 102 and pair of camera devices 105, stereo camera device 102a further comprises: a first device 560 configured to change the tilting of the respective FOVs of pair of camera devices 105a; and at least a second device 570 configured to move a respective image sensor 438 of each of pair of camera devices 105a along the baseboard 447 and away from each other as the tilting increases. As depicted, first device 560 is integrated with connector 450a, which is otherwise similar to connector 450, and two second devices 570 are included, one device 570 mounted on each baseboard 447, in contact with a respective image sensor 438. First device 560 can comprise a motorized hinge, and the like, in communication with processor 120, and processor 120 can be further configured to control an angle of the motorized hinge such that connector 450a, in turn, opens/widens or closes/narrows to change a tilt angle between camera devices 105a (the widening indicated by the arrows extending from connector 450a, though connector 450a can also move opposite the direction indicated by the arrows).

Each of second devices 570 can comprise one or more of a respective stepper motor, a respective piezoelectric device, piezoelectric materials, electroactive elastomers and the like, in communication with processor 120, and processor 120 can be further configured to control each of second devices 570 to move each respective image sensor 438 away from each other as the tilt angle increases (as indicated by the arrows extending from each sensor 438), and to move each respective image sensor 438 towards each other as the tilt angle decreases. In particular, each second devices 570 can be configured to move a respective image sensor 438 when an electrical signal and/or a voltage and/or a current is applied thereto.

Indeed, processor 120 can be further configured to control a respective tilting of each of first device 560 and second devices 570, for example to coordinate a respective tilt angle of each of first device 560 and second devices 570.

Such a scheme can ensure that the common working FOV 430 is imaged by each respective image sensor 438 as the tilt angle changes, at least up to a maximum tilt angle.

It is further assumed that each respective image sensor 438 is moveable with respect to a respective baseboard 447 and hence each camera device 105a can comprise a track, a groove and the like along which a respective image sensor 438 can move. Alternatively, each of second devices 570 can be configured to move each respective image sensor 438 away from each other as the tilt angle increases, and to move each respective image sensor 438 towards each other as the tilt angle decreases. In such implementations, lenses 440 can be fixed, with respective focal distances of lenses 440 located on a plane of a respective image sensor 438.

In general, as the tilt angle increases, the depth resolution increases, as pixel disparity increases, however common working FOV 430 will decrease; eventually, as the tilt angle increases, common working FOV 430 will be too small to be useful for a given application; as such, maximum tilt angle can be defined (and for example stored in memory 122) to limit a maximum tilt between camera devices 105a.

Figure 6:
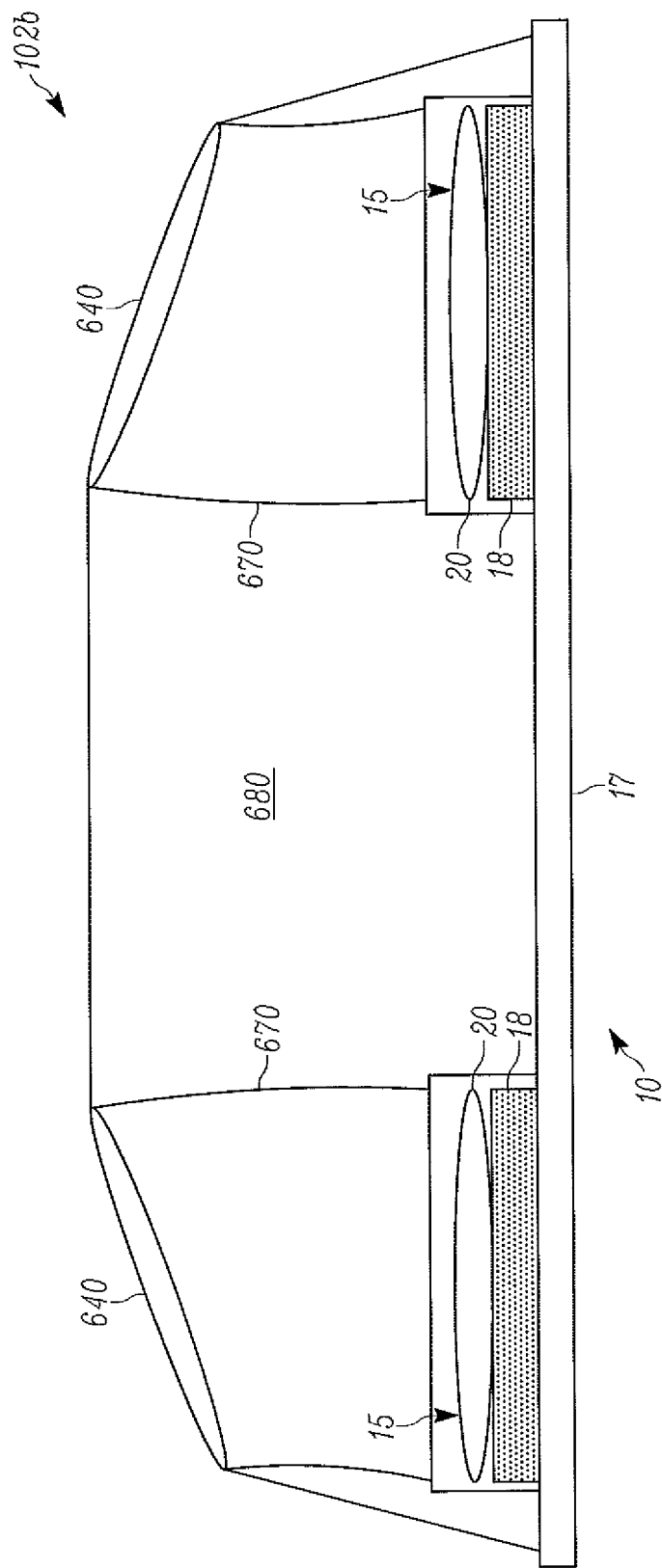
FIG. 6 depicts an alternative stereo camera device with tilted fields of view, in accordance with some implementations.

Attention is next directed to FIG. 6 which depicts an alternative stereo camera device 102b, in which prior art stereo camera device 10 is modified and adapted to tilt respective FOVs of pair of camera devices 15 away from each other, while maintaining the condition of respective FOVs at least partially overlapping in a common working FOV.

In particular, as described above, respective image sensors 18 of each of pair of camera devices 15 are mounted on flat stereo board 17, and each of pair of camera devices 15 comprises a respective tilted lens 640 and a respective optical fiber 670 which conveys light from respective lens 640 to a respective image sensor 18. As depicted, prior art stereo camera device 10 further comprises lenses 20; however, each respective tilted lens 640 is offset from lenses 20 using an optical attachment 680 (drawn schematically) which, for example, can be removably or permanently attached to prior art stereo camera device 10 using any suitable attachment method, such as one or more fasteners and/or an adhesive, and may include various mechanical components, including a housing. In the illustrated example, respective tilted lenses 640 and respective optical fibers 670 are components of optical attachment 680 to flat stereo board 17. In other words, optical attachment 680 comprises a housing (schematically depicted), tilted lenses 640 and respective optical fibers 670 which are configured to change a common working FOV of prior art stereo camera device 10 when attached thereto.

Hence, at least an output of each respective optical fiber 670 is configured to convey images from a respective tilted lens 640 to a respective image sensor 18 (which can include conveying the images via lenses 20).

While a particular physical configuration of optical attachment 680 is depicted which, for example, includes a gap that is shown between an inner end of each respective optical fiber 670 and each lens 20, optical attachment 680 can have any suitable physical configuration that enables adapting prior art stereo camera device 10 to behave similar to stereo camera devices 102, 102a. Furthermore, while only one optical fiber 670 is depicted respective to each camera device 15, more than one optical fiber 670 can be disposed respective to each camera device 15, as long as the optical fiber(s) 670 convey light over an area of each respective lens 640 to an area of each respective lens 20; in other words, each of optical fibers 640 can convey the entire light field of lens 640 to lens 20.

Regardless, optical attachment 680 is generally configured to adapt prior art flat stereo camera devices to have fields of view tilted away from one another to increase pixel disparity of objects being imageed by the flat stereo camera devices.

Hence, provided herein are various implementations of stereo camera devices that include pairs of camera devices having respective fields of view tilted away from each other, but having an overlapping and/or common working field of view. In implementations depicted in FIG. 2 to FIG. 6, images of objects being imaged stereoscopically by cameras having respective FOVs tilted away from each other can have greater pixel disparity than similar images acquired by flat stereo camera devices, as well as devices where the fields of view of cameras are pointed towards each other, and hence can have an improved depth resolution.

Figure 7:
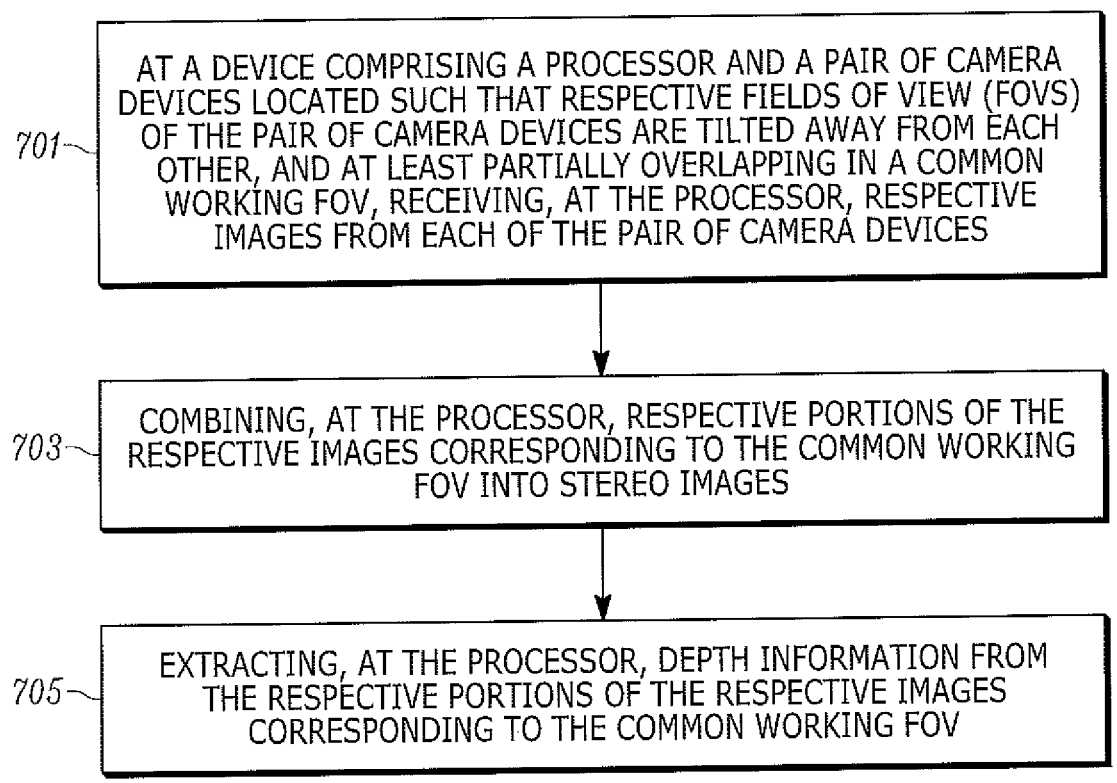
FIG. 7 depicts a block diagram of a flowchart of a method for combining images from camera devices, according to non-limiting implementations.

Attention is now directed to FIG. 7 which depicts a block diagram of a flowchart of a method 700 for combining images from camera devices, according to non-limiting implementations. In order to assist in the explanation of method 700, it will be assumed that method 700 is performed using device 101, and specifically by processor 120 at each device 101, when each processor 120 processes respective instructions stored at a respective memory 122, for example application 136. Indeed, method 700 is one way in which device 101 can be configured. Furthermore, the following discussion of method 700 will lead to a further understanding of device 101, and its various components. However, it is to be understood that device 101 and/or method 700 can be varied, and need not work exactly as discussed herein in conjunction with each other, and that such variations are within the scope of present implementations.

Regardless, it is to be emphasized, that method 700 need not be performed in the exact sequence as shown, unless otherwise indicated; and likewise various blocks may be performed in parallel rather than in sequence; hence the elements of method 700 are referred to herein as "blocks" rather than "steps". It is also to be understood, however, that method 700 can be implemented on variations of device 101 as well.

At block 701, at device 101 comprising processor 120 and a pair of camera devices 105 located such that respective fields of view (FOV s) of pair of camera devices 105 are tilted away from each other, and at least partially overlapping in a common working FOV, processor 120 receives respective images from each of pair of camera devices 105.

At block 703, processor 120 combines respective portions of the respective images corresponding to the common working FOV into stereo images.

At block 705, processor 120 can extract depth information from the respective portions of the respective images corresponding to the common working FOV.

Furthermore, assuming that device 120 further comprises: a first device 560 configured to change tilting of the respective FOVs 425 of pair of camera devices 105; and second device 570 configured to move a respective image sensor 438 of each of pair of camera devices 105 away from each other as tilting of the respective FOVs of pair of camera devices 105 increases, processor 120 can, at any of blocks 701, 703, 705 control a respective tilting of each of first device 560 and second device 570, as described above.

In the foregoing specification, specific implementations have been described. However, one of ordinary skill in the art appreciates that various modifications and changes can be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

I claim:

1. A device comprising:
a pair of camera devices located such that respective fields of view (FOVs) of the pair of camera devices are tilted away from each other by a tilt angle and at least partially overlapping in a common working FOV;
a processor configured to:
receive respective images from each of the pair of camera devices; and
combine respective portions of the respective images corresponding to the common working FOV into stereo images, wherein respective image sensors of each of the pair of camera devices are located on respective baseboards tilted away from each other at the tilt angle, each respective image sensor disposed off-center with respect to a respective lens; and
a connector that comprises an arm supporting each of the baseboards and defines the tilt angle as a pair of symmetric tilt angles of centerlines of respective FOVs with respect to a centerline disposed between the pair of camera devices.

2. The device of claim 1, wherein the respective lens is a wide-angle lens.

3. The device of claim 1, wherein each camera device in the pair of camera devices comprises the respective image sensor and the respective lens, respective FOVs of each of the respective image sensor and the respective lens about matching each other.

4. The device of claim 2, wherein each camera device in the pair of camera devices comprise the respective image sensor and the respective wide-angle lens, image sensor FOVs being smaller than lens FOVs, the lens FOVs corresponding to the respective FOVs of each camera device in the pair of camera devices that at least partially overlap, a respective position of the respective image sensor being selected such that each of the image sensor FOVs are common to an overlapping portion of the lens FOVs.

5. The device of claim 1, further comprising a movement device configured to move respective image sensors of the pair of camera devices away from each other as the tilt angle increases.

6. The device of claim 1, wherein the processor is configured to extract depth information from the respective portions of the respective images corresponding to the common working FOV.

7. The device of claim 1, further comprising a chassis, external components of the pair of camera devices being located on a same side of the chassis.

8. The device of claim 1, wherein the device is a mobile scanner.

9. The device of claim 1, wherein the device is a mobile computing device.

10. The device of claim 1, wherein the arm is a semicircular arm.

11. A method comprising:
at a device comprising a processor and a pair of camera devices located such that respective fields of view (FOVs) of the pair of camera devices are tilted away from each other by a tilt angle and at least partially overlapping in a common working FOV:
receiving, at the processor, respective images from each of the pair of camera devices;
combining, at the processor, respective portions of the respective images corresponding to the common working FOV into stereo images, wherein the device further comprises respective image sensors of each of the pair of camera devices, the respective image sensors located on respective baseboards tilted away from each other, each respective image sensor disposed off-center with respect to a respective lens; and
setting, using a connector, the tilt angle by controlling an arm of the connector, the arm supporting each of the baseboards and defining the tilt angle as a pair of symmetric tilt angles of centerlines of respective FOV with respect to a centerline disposed between the pair of camera devices.

12. The method of claim 11, further comprising extracting, at the processor, depth information from the respective portions of the respective images corresponding to the common working FOV.

13. The method of claim 11, wherein the device further comprises a movement device configured to move a respective image sensor of each of the pair of camera devices away from each other as the tilt angle increases.

14. The method of claim 11, wherein the arm is a semicircular arm.

15. A device comprising:
a pair of camera devices located such that respective fields of view (FOVs) of the pair of camera devices are tilted away from each other and at least partially overlapping in a common working FOV;
a processor configured to:
receive respective images from each of the pair of camera devices; and
combine respective portions of the respective images corresponding to the common working FOV into stereo images, each of the pair of camera devices comprising: (a) respective image sensors mounted on a flat stereo board, and (b) a modular housing, the housing mounted to a face of the pair of camera devices, the housing comprising respective tilted lenses and respective optical fibers which convey light from the respective tilted lenses to the respective image sensors.

16. The device of claim 15, wherein the respective tilted lenses and the respective optical fibers are components of an optical attachment to the flat stereo board.

17. The device of claim 15, wherein the device is a mobile scanner.

* * * * *